Sept. 6, 1955
O. J. POUPITCH
2,716,760
METHOD AND MACHINE FOR ASSEMBLING
WASHERS WITH ROTARY FASTENERS
Filed Aug. 3, 1950
6 Sheets-Sheet 1
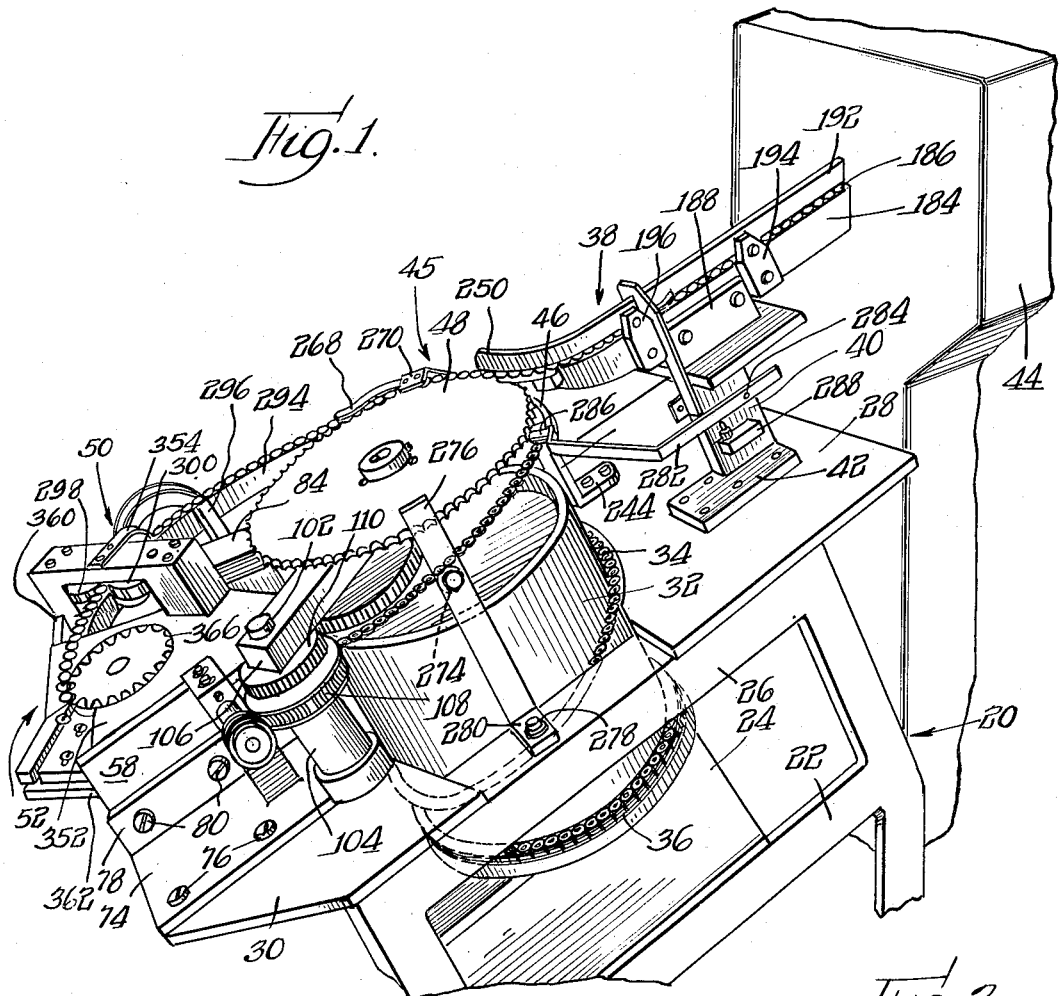
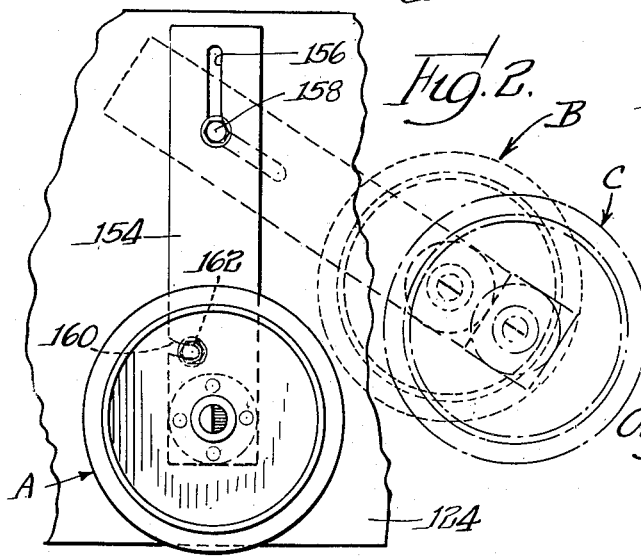
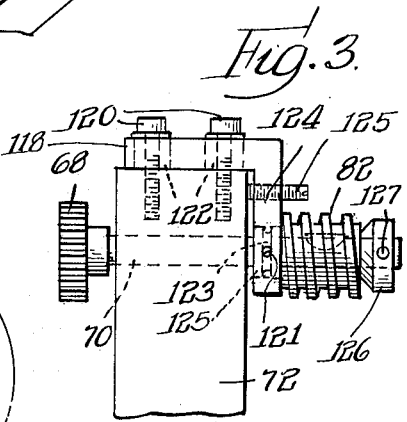
INVENTOR.
Ougljesa Jules Poupitch
BY
Moore, Olson & Trexler
Attys.

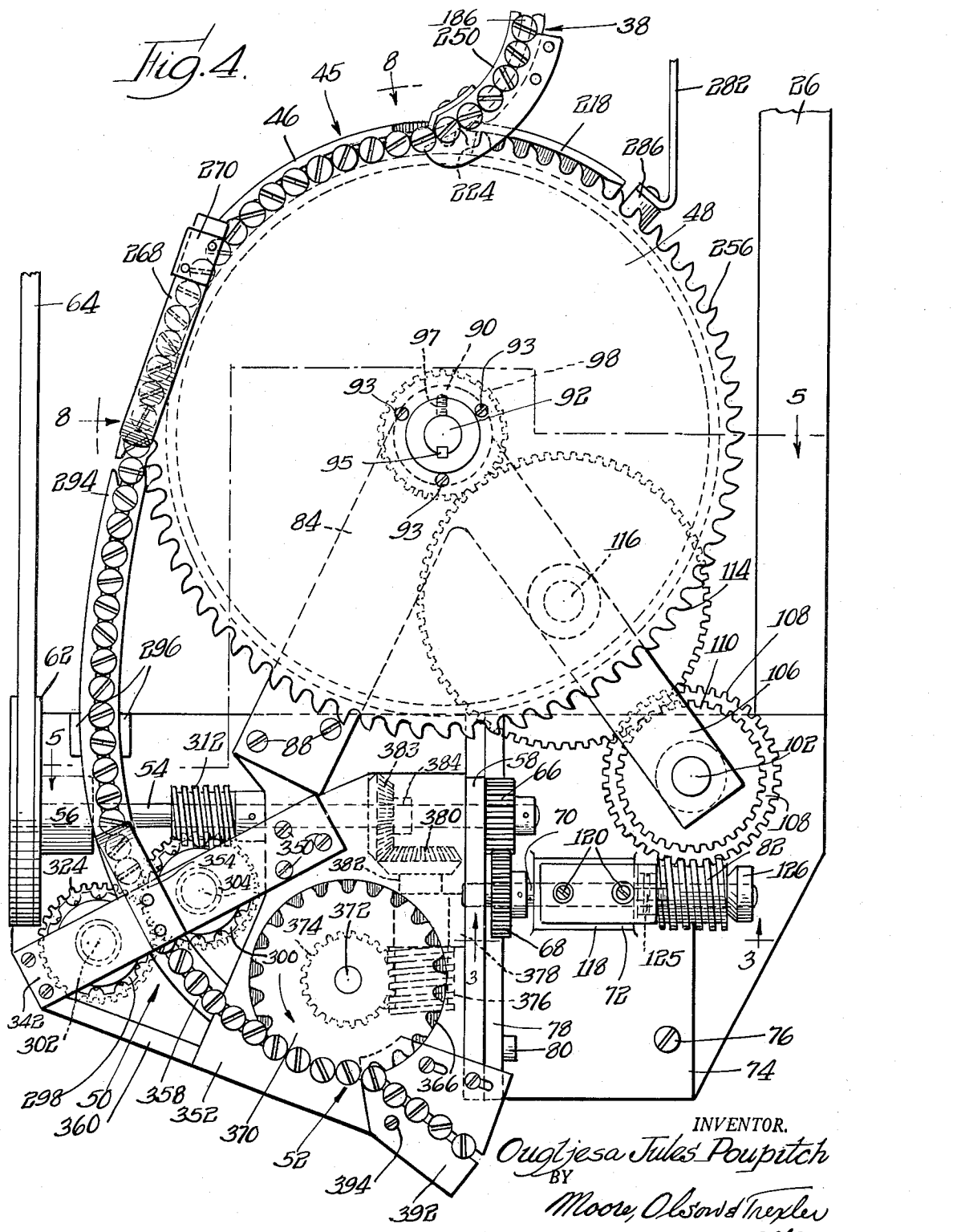

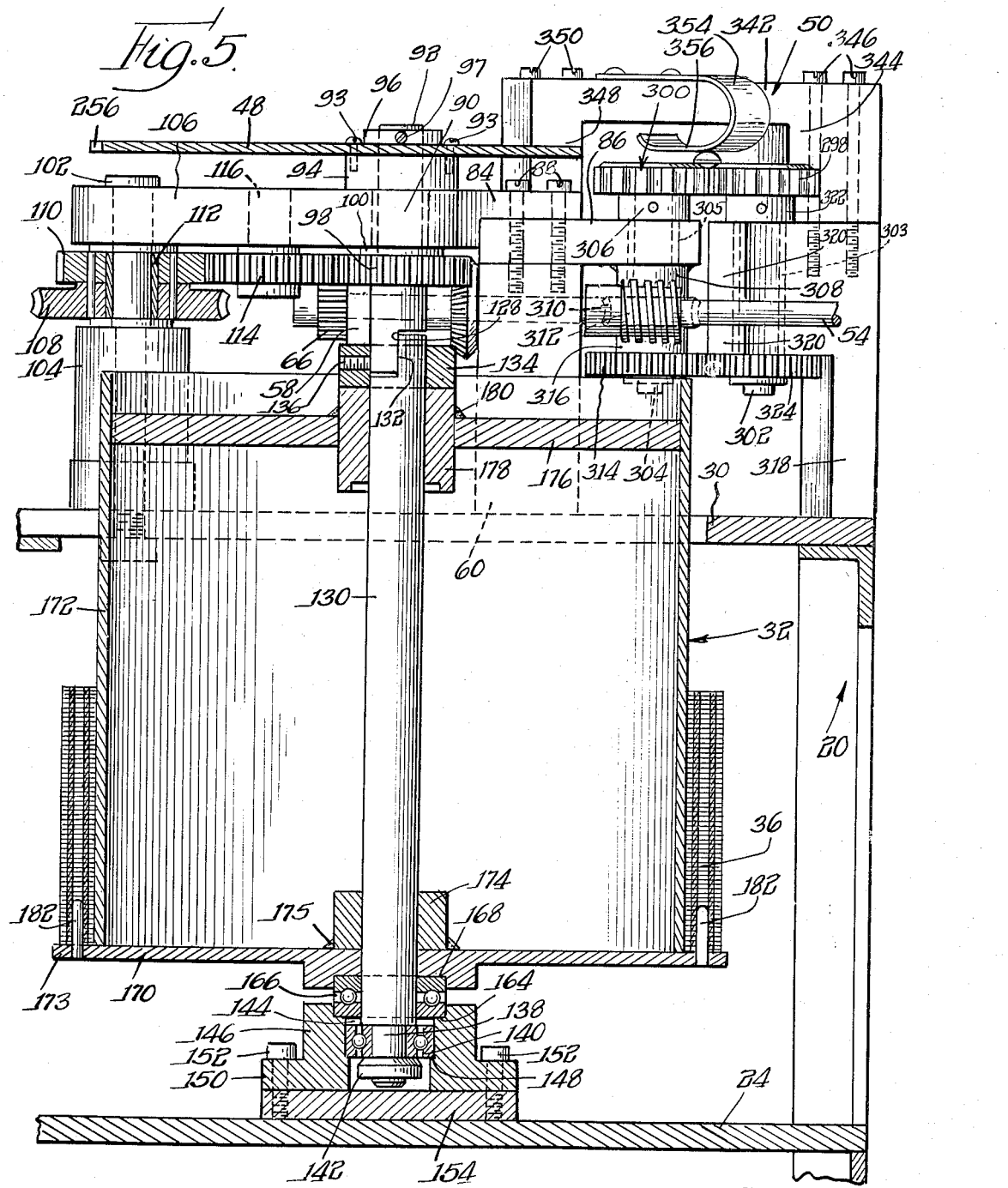

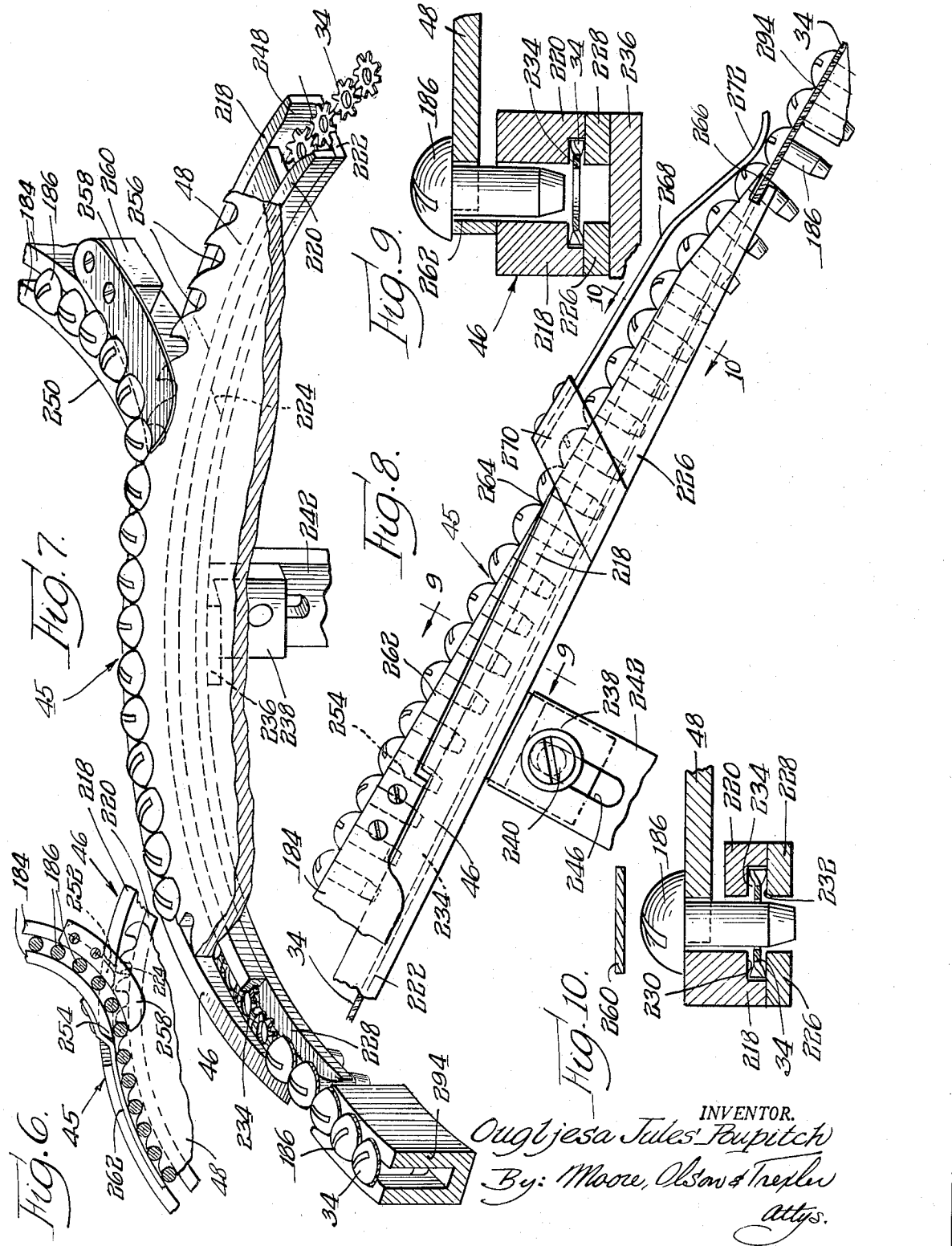

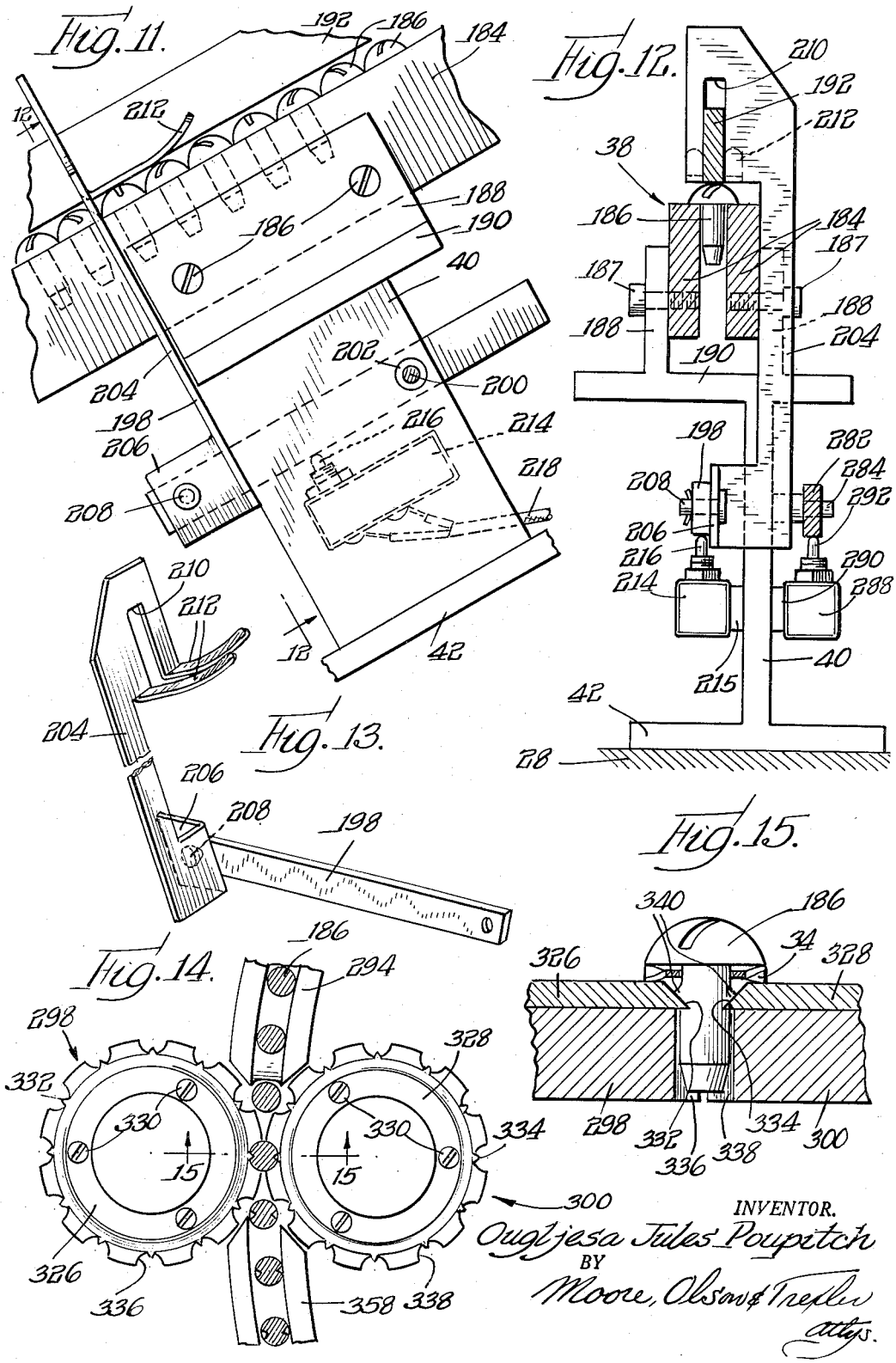

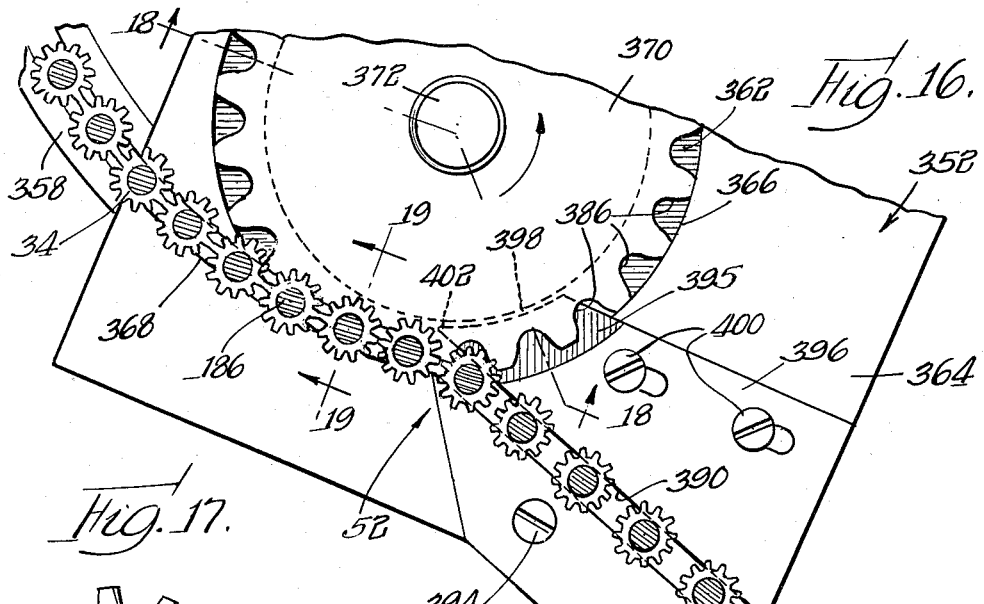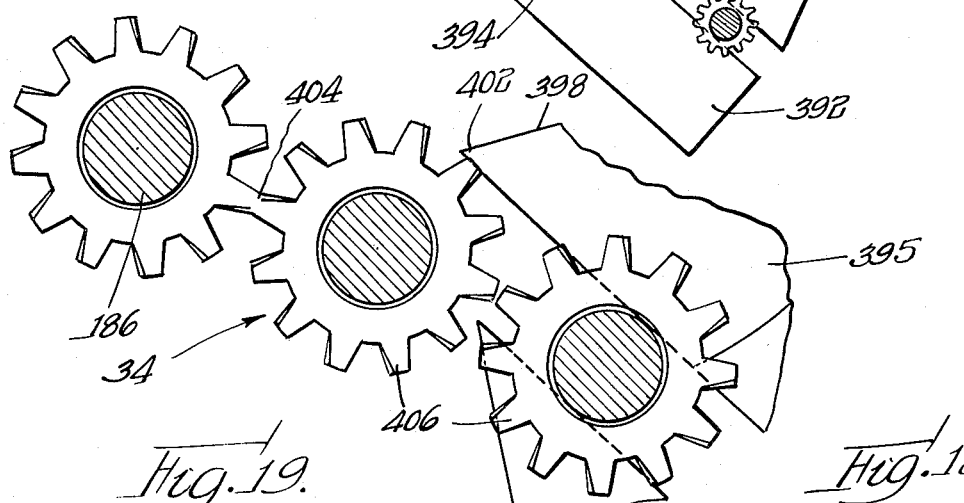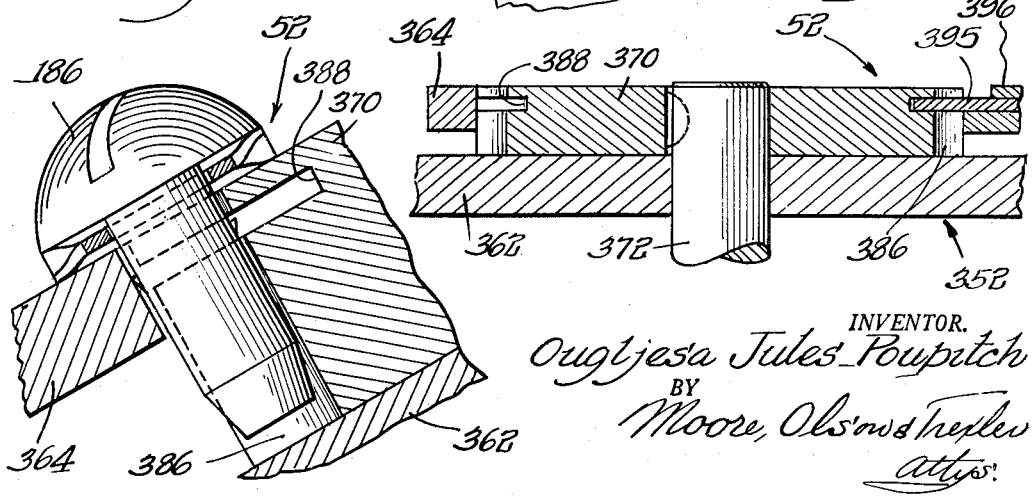

United States Patent Office 2,716,760
Patented Sept. 6, 1955

2,716,760
METHOD AND MACHINE FOR ASSEMBLING WASHERS WITH ROTARY FASTENERS

Ougljesa Jules Poupitch, Chicago, Ill., assignor to Illinois Tool Works, Chicago, Ill., a corporation of Illinois Application August 3, 1950, Serial No. 177,536

37 Claims. (Cl. 10—155)

This invention relates to a method and machine or apparatus for assembling washers with rotary threaded or threadable fasteners particularly lock washers and screws or screw blanks.

An object of this invention is the provision of an improved apparatus for the continuous assembly of rotary fasteners and a strip of washers.

Prior machines for assembling rotary fasteners and washers have been limited in capacity by reason of the use of intermittently operated mechanism for feeding either the fasteners or the washers to the assembly station or by the use of intermittently operated assembly mechanism. Such assembly machines are frequently associated with or are part of a thread rolling machine the capacity of which is limited.

Among the important objects of this invention is the provision of a method, machine or mechanism for assembling rotary fasteners and washers at a rate of speed greater than that heretofore possible.

A further important object of this invention is the provision of apparatus for receiving a stacked roll of washers and for assembling washers from said roll with a succession of rotary fastening elements.

Another object of this invention is the provision of apparatus for assembling a succession of rotary fasteners with a curved strip of washers.

A specific object of this invention is the provision of apparatus for assembling washers in strip form moving from a helical coil with a succession of rotary fasteners.

A further object of this invention is the provision of apparatus for continuously assembling screw blanks and washers wherein the screw blanks are engaged by the shanks for positioning and for rapid positive feeding at the time of assembly.

A further object of this invention is the provision of methods and apparatus for telescopically assembling a succession of rotary fastening elements and a strip of washers in which the rotary fastening elements and washers are brought into telescoping engagement over paths converging substantially linearly relative to one another.

Yet another important object of this invention is the provision of apparatus for assembling a succession of rotary fastening elements and a strip of washers which is operable without the necessity of integral or cooperating thread rolling mechanisms.

Another object of this invention is the provision in apparatus for telescopically assembling a succession of rotary fastening elements and a strip of washers of means for temporarily securing assembled washers and fastening elements in assembled relation in order that assembled fastening elements and washers may be supplied from a single assembly apparatus to a plurality of thread rolling mechanisms.

A still further object of this invention is the provision of apparatus for telescopically assembling screw blanks and washers wherein sections of the shanks are displaced outwardly to retain washers on said shanks.

A specific object of this invention is the provision in apparatus for telescopically assembling screw blanks and washers of means for displacing narrow sections of the shanks outwardly to form washer retainers adapted to be rolled out in a succeeding thread rolling operation.

An object of this invention is the provision in apparatus for continuously assembling a succession of rotary fastening elements and a strip of washers connected directly to one another of means for separating successive washers from one another while said strip is moving continuously after assembly with said threaded fasteners.

A more particular object of this invention is the provision of apparatus as set forth in the last foregoing object wherein the washers assembled with rotary fastening elements are changed abruptly in their direction of movement to sever assembled washers from one another.

A further object of this invention is the provision in apparatus for continuously assembling a succession of rotary fastening elements and a strip of washers of structure for continuously turning each assembled fastening element and washer to sever the assembled unit from the remainder of the strip.

Yet another object of this invention is to provide a method of continuously assembling rotary fastening elements with a strip of washers and continuously turning assembled fastening elements and washers to detach the assembled units successively from the remainder of the strip.

Generally, my invention comprises feeding a hardened or pre-tempered strip of toothed lock washers having confronting teeth of successive washers interconnected over a curved path from a helical coil. The strip is moved over a curved path into convergence with a succession of spaced screw blanks also moving over a curved path, the two curved paths converging relatively linearly. After being telescopically assembled by converging movement with the washer strip, the screw blanks have narrow sections of their shanks displaced outwardly to form temporary retainers adapted to be rolled out in a later thread rolling operation. Each successive washer is then broken away from the adjacent washer by turning or bending it in the plane of the strip relative to the remainder of the strip and the assembled washers and blanks are further advanced and may be fed to a storage container or supplied directly to a plurality of thread rolling mechanisms.

The details of the invention as well as further objects and advantages thereof will be understood from the following description when taken in connection with the accompanying drawings in which:

Fig. 1 is a perspective view of an assembly machine embodying the principles of my invention;

Fig. 2 is a top view illustrating the movement of the drum for receiving a new coil of washers;

Fig. 3 is a detailed view taken substantially along the line 3—3 of Fig. 4;

Fig. 4 is a top view of the assembly machine;

Fig. 5 is a sectional view taken substantially along the line 5—5 of Fig. 4;

Fig. 6 is a fragmentary top view of a portion of the assembly mechanism;

Fig. 7 is a perspective view of the assembly mechanism with certain parts broken away;

Fig. 8 is a side view of the washer and screw assembly track taken substantially along the line 8—8 of Fig. 4;

Fig. 9 is a sectional view taken along the line 9—9 of Fig. 8;

Fig. 10 is a sectional view taken along the line 10—10 of Fig. 8;

Fig. 11 is a fragmentary side view showing the screw sensing mechanism associated with the screw feed chute with certain parts in the foreground removed;

Fig. 12 is a sectional view taken along the line 12—12 of Fig. 11 with the parts restored;

Fig. 13 is a perspective view of the screw sensing arm;

Fig. 14 is a top view with certain parts broken away showing the mechanism for nicking the screw shanks beneath the washer strip;

Fig. 15 is a sectional view taken along the line 15—15 of Fig. 14;

Fig. 16 is a top view of the mechanism for separating assembled screws and washers from the continuous washer strip;

Fig. 17 is an enlarged view showing the separation of assembled fasteners and washers from the remainder of the strip;

Fig. 18 is a sectional view taken substantially along the line 18—18 of Fig. 16; and Fig. 19 is a sectional view taken along the line 19—19 of Fig. 16.

The general construction of my assembly machine including the driving mechanism thereof best may be seen in Figs. 1, 4 and 5, to which reference should be had at this time. A supporting frame 20 has lower inclined supports 22 (only one of which is shown) carrying a lower inclined table 24, and upper inclined supports 26 carrying first and second upper inclined tables 28 and 30 respectively. A rotatable drum 32 is carried by a pivotal support on the lower table 24 and carries a helically coiled continuous strip of washers 34 in nested relation as shown at 36. Typically, the washers of the strip have outwardly extending teeth with confronting teeth of adjacent washers connected to one another. The entire strip is hardened or pre-tempered after coiling and cannot be straightened out without danger of breaking adjacent washers apart.

A screw feeding chute 38 is supported by a column 40 upstanding from a base 42 secured to the first upper table 28 as by bolts. Headed screw blanks are fed by gravity down the screw feed chute from a hopper 44 of any preferred construction delivering blanks with their shanks substantially in a vertical plane and supported by their heads.

From the screw feed chute 38, the blanks pass to assembly mechanism 45 comprising an assembly track 46 and a screw feed or driving disc 48. The washer strip 34 is also received by the assembly track 46 which brings the screw blanks and washers into telescoping relation. The assembled blanks and washer strip then pass through a retainer forming mechanism 50 whereat narrow sections of the shanks of the blanks are swaged or displaced outwardly to form temporary retainers preventing separation of the blanks and the washers prior to rolling of threads on the blanks. The assembled blanks and washer strip then pass on to separating mechanism 52 at which point the individual washers are separated from the continuous strip so that the assembled washers and blanks may be stored or advanced individually to a plurality of other mechanisms for rolling threads on the screw blanks. The thread rolling mechanism rolls the temporary retainers out and no trace of them remains on the screw shanks.

The screw feed disc 48, the retainer forming mechanism 50 and the separating mechanism 52 all are driven positively from the same power source while the drum 32 is driven impositively from the same source. A main drive shaft 54 (Figs. 4 and 5) is journalled in an arm 56 upstanding from the second upper table 30, in a wall 58 upstanding from the table 30, and in an intermediate support 60 also carried by the table 30. A pulley 62 is mounted on the end of the drive shaft 54 and is driven by a flexible belt 64 from an electric motor (not shown). A spur gear 66 is secured to the other end of the drive shaft 54 for rotation therewith on the other side of the upstanding wall 58. A second spur gear 68 is meshed with and driven by the spur gear 66 and is mounted to drive a shaft 70 journalled in the upstanding wall 58 and in an arm 72 (Figs. 3 and 4) upstanding from an angle bracket 74 (Figs. 1 and 4) secured to the table 30 by bolts or screws 76. The upstanding wall 58 noted heretofore is secured to a flange 78 on the angle bracket 74 by means of bolts 80 and is thus supported by the second upper table 30. The axial thickness of the second spur gear 68 will be seen to be less than that of the spur gear 66 with which it is meshed and the reason for this will be apparent presently. A worm 82 is carried on the outer end of the shaft 70 and is keyed to the shaft for rotation therewith.

A V-shaped supporting bar 84 (Figs. 1, 4 and 5) is secured at one end atop the intermediate support 60, along with a supporting arm 86 for the retainer forming mechanism 50, as by screws or bolts 88. The apex 90 of the V-shaped arm 84 has journalled in it a shaft 92 carrying near its top end the screw feed disc 48. A sleeve 94 spaces the disc from the bar 84 and has a portion of small diameter 96 extending upwardly through the disc. Screws 93 extend through the disc into the sleeve 94. The portion 96 is secured to the shaft for rotation therewith by a key 95 and a set screw 97. A spur gear 98 is carried and driven by the shaft 92 below the arm 84 and is spaced from the arm by a collar or shoulder 100.

A headed shaft 102 is mounted perpendicular to the second upper table 30 by means of an upstanding column 104 secured to that table as by welding and by means of the free end 106 of the V-shaped supporting arm 84, a nut being threaded on the lower end of the shaft to secure it in place. A worm wheel 108 is mounted on the shaft 102 and has a spur gear 110 just above it pinned to it for rotation thereby. The two gears 108 and 110 are provided with a common sleeve bearing 112. An intermediate spur gear 114 journalled on a shaft 116 carried by the V-shaped arm 84 intermediate the apex and the free end thereof is meshed with the spur gear 110 and with the spur gear 98 on the shaft carrying the screw feed disc 48. Thus when the pulley wheel 62 is rotated by the belt 64, rotational movement is transmitted through the drive shaft 54, spur gears 66 and 68, shaft 70, worm and worm wheel 82 and 108, and spur gears 110, 114 and 98 to drive the shaft 92 and the screw feed disc 48 fixed thereto.

As will be seen later, motive power for the retainer forming and separating mechanism is also derived from the common drive shaft 54 and this in addition to the screw feed disc 48 advances the screw blanks and washer strip. To prevent buckling or tearing of the washer strip it is necessary that the driving members of the nicking and separating stations be driven in synchronism with the screw feed disc 48 and in proper phase relative thereto. Accordingly, I have provided means for properly adjusting the phase including the shaft 70 and the spur gear 68 and worm 82 thereon (Figs. 3 and 4). An angle bracket 118 is secured to the top of the arm 72 by screws 120 passing through elongated slots 122 and threaded into the top of the arm 72. The depending arm 124 of the angle bracket 118 fits about the hub 125 of the worm 82 and a set screw 121 in the bracket extends into a peripheral slot 123 in the hub 125 so that when the screws 120 are loosened and the bracket 118 is shifted either to the right or the left, it shifts the worm similarly to the right or left and consequently rotates the worm wheel 108 and gearing driven thereby relative to the drive shaft 54 to vary the phase between the screw feed disc 48 and the retainer forming and separating mechanisms 50 and 52. A set screw 125 is provided in the depending arm 124 abutting the arm 72 to facilitate this adjustment. The worm is slidable on the shaft 70 and a collar 126 on the end of the shaft 70 is provided with a set screw 127 so that the collar can be shifted along the shaft as the worm shifts on the shaft and then tightened to lock the shaft in position.

The shaft 92 carrying the screw feed disc 48 is provided at its lower end with a shoulder portion 128 (Fig. 5) and a drum supporting shaft 130 having a complementary configuration 132 interfits therewith. The interfitting ends of the shaft are held in axial alignment by a collar 134 carrying a set screw 136 impinging against the lower end of the shaft 92 to lock the collar relative thereto. The lower end of the drum supporting shaft 130 is provided with a portion 138 of reduced diameter over which the inner race of a ball bearing 140 is clamped by a nut 142 threaded thereon. The outer race of the ball bearing 140 fits within a central bore 144 of a support 146 and rests on a shoulder 148 therein.

The support 146 is provided with a peripheral flange 150 secured by screws 152 passing through it and threaded into an arm 154 carried by the lower inclined table 24. The arm 154 is provided with a longitudinal slot 156 (Fig. 2) near the end opposite the support 146 and a bolt 158 passes through the slot and into the table 24 pivotally to support the arm thereon. An arcuate slot 160 is provided in the left side of the arm (as seen in Fig. 2) near the support 146 and a bolt 162 passes therethrough and is threaded into the table 24 so that the arm can be clamped rigidly in place.

The bore 144 of the support 146 is provided near the top thereof with a second shoulder 164 supporting the lower race of a thrust bearing 166 of the type adapted to resist end thrust. The upper race of the bearing is received in a recess 168 in a downwardly extending boss on the lower end plate 170 of the drum 32. The cylindrical portion 172 of the drum is spaced inwardly from the periphery of the lower end plate 170 to leave a peripheral flange 173 and may be secured to the lower end plate by any suitable means such as welding.

The end plate 170 fits frictionally about the shaft 130, and a collar 174 which likewise fits frictionally about the shaft is welded to the top surface of the end plate as at 175. An upper end plate 176 is secured to the cylindrical portion 172 a slight distance below the top edge thereof by any desirable means such as screws or welding. A collar 178 frictionally fitting about the shaft 130 is secured, as by a weld 180, within a central aperture in the upper end plate 176. The collar 134 secured to the shaft 92 may be seen to abut the top surface of the collar 178 and it is to be understood that the contact between these two collars is a frictional fit. The frictional contact between the shaft 130 and the parts secured to the drum tends to cause the drum to rotate with the shaft, but does not positively drive the drum.

Spaced upstanding pins 182 are provided on the peripheral flange 173 at the bottom of the drum, and when a helical coil of washers is placed over the drum to rest on the flange 173, the pins 182 fit into the apertures of the nested washers to drive the coil.

The screw delivery chute 38 (Figs. 1, 11, and 12) leading downward from the hopper 44 comprises a pair of parallel tracks 184 spaced apart a distance just slightly greater than the diameter of the shanks of the screw blanks 186 being delivered thereby. The tracks are supported and carried in spaced relation near their lower ends by screws 187 spaced through the upstanding flanges 188 of a bifurcated bracket 190 carried by and preferably integral with the column 40. As noted heretofore the column 40 has a base 42 perpendicular to it and the base is secured flat against the first upper table 28 by some means such as screws. In addition to the tracks 184, the screw delivery chute 38 includes a rail 192 located centrally of the tracks and spaced above them a sufficient distance to allow the heads of the screw blanks 186 just to pass underneath. The rail 192 prevents screw blanks from moving upwardly out of their proper positions between the tracks and is supported by brackets 194 and 196 (Fig. 1) located just above and below the flanges 188 and secured to the tracks 184 and to the rail 192 as by bolts. Preferably a slotted connection is provided between the rail 192 and the brackets 194 so that the rail may be moved up or down relative to the tracks 184 to accommodate screw blanks having heads of different sizes.

In order to prevent operation of the assembly machine when no screw blanks are being fed down the feed chute 38, screw sensing mechanism is provided as shown in Figs. 1 and 11–13 including a lever arm 198 pivotally connected to the column 40 by a pin 200 extending therethrough and spaced from the column by a boss (not shown). A screw sensing arm 204 has a transverse flange 206 pivotally connected by a pin 208 to lever arm 198. The arm 204 is provided at its upper end with a laterally extending flange having a vertical slot 210. A pair of spaced sensing fingers 212 extend transversely from the laterally extending flange and are adapted to rest lightly on the heads of advancing screws when the screw sensing arm 204 is placed in position with the slot 210 accommodating the rail 192. The arm 204 is prevented from pivoting with the movement of advancing screw blanks by abutment against the brackets 196.

A normally closed switch 214 is secured by means of a bracket 215 to the upstanding column 40 and has a switch actuating plunger 216 in contact with the lower edge of lever arm 198. The switch is provided with lead wires 218 either directly in series with the driving electric motor (not shown) for the assembly machine or in circuit with a relay having contacts in series with this motor. If no screws are present in the screw feed chute 38, the weight of the lever arm 198 and sensing arm 204 causes the fingers 212 to drop down to the tracks 184, thus pivoting the lever arm 198 and depressing the switch actuating plunger 216 to open the switch 214 which causes the circuit of the driving motor to be opened so that the assembly machine ceases operation. It may be seen that the leading tips of the fingers 212 are curved upwardly so that succeeding screws pass smoothly under the fingers and the sensing arm readily may be raised by a further supply of screw blanks in the screw feed chute.

Screw blanks 186 from the screw feed or delivery chute 38 and the washer strip 34 from the drum 32 both feed into the assembly mechanism 45 where they are assembled. Reference should be had to Figs. 1, 4, 6, 7, and 8 wherein the assembly mechanism is shown.

The assembly mechanism includes assembly track 46 which in turn comprises a pair of parallel arcuate rails 218 and 220 spaced apart a distance just slightly greater than the diameter of the shanks of the screw blanks 186 with the inner rail 220 underlying the periphery of the drive disc 48. A lower wall 222 is secured to the rails by any desirable means such as screws or welding and is slotted from 224 (Figs. 4 and 7) to the trailing end thereof to form flanges 226 and 228 (Figs. 9 and 10) which cooperate with slots 230 and 232 in the inner faces of the rails 218 and 220 to form a guideway 234 progressively approaching the drive disc 48 and guiding the washer strip 34. An upper wall extends rearwardly a very short distance from the leading end of the assembly track to help guide the washer strip as will be apparent. The assembly track 46 is supported by means of an angle bracket having a transverse arm 236 secured beneath the flanges 226 and 228 by suitable means such as screws or welding. A depending arm 238 of the bracket is threaded to receive a screw 240. An arm 242 is slotted near its top to receive the screw 240 and is provided at its lower end with a transverse foot 244 secured to the first upper table 28 by means such as screws. The assembly track may be adjusted upwardly and downwardly and pivotally by means of the screw 240 fitting in the longitudinal slot 246.

The inner rail 220 is continuous and is of constant height up to its trailing end at which point it is cut down as will be seen shortly. The outer rail 218 is continuous but is not of uniform height as will be seen shortly. Both of the rails have the inner surfaces of their leading ends flared outwardly at 248 to receive and center the washer strip 34 with greatest facility.

The screw feed chute 38 is curved near its lower end at 250 to approach the assembly track 46 and the drive disc 48 tangentially. The curved end of the track 184 closest to the assembly track and drive disc extends as far as the inner edge of the rail 218 where it is terminated at 252 (Fig. 6), the rail 218 being cut down to accommodate the aforesaid track 184. The outermost track 184 extends beyond the inner track, fitting within the cut down portion of the rail 218, and is terminated at 254 along the arc of the inner surface of the rail 218, the inner edge of this track 184 merging with the aforesaid arc thereat.

The periphery of the disc 48 is provided with alternate spaced notches and teeth 256. The shanks of the screw blanks are received in the notches and are engaged by the teeth to drive the screw blanks 186. To provide support for the screw blanks when moving from the tracks 184 until they are positively engaged by the disc 48, a thin metal arm 258 is provided which is carried by the inner of the tracks 184 by means of a mounting block 260. The arm overlies the disc 48 and continues along substantially the same curve as the tracks 184.

An arcuate finger 262 is secured to the outer track 184 near the extremity 254 thereof by means such as screws and extends arcuately with its inner surface contiguous with the inner arc of the rail 218. The upper edge of the finger 262 as well as that of the rail 184 adjacent the end 254 thereof lies in the plane of the upper surface of the drive disc 48 so that the screw blanks are supported beneath their heads evenly from opposite sides. Immediately following the end 254 of the track 184 the rail 218 begins to rise from the cut down portion and the finger 262 narrows to a point at 264 from whence the top surface of the rail 218 continues parallel to the top edge of the finger 262 in the plane of the top surface of the drive disc 48.

As best may be seen in Fig. 8 the top surfaces of the disc 48, the finger 262, and the rail 218 gradually converge with the guideway 234 carrying the washer strip 34 so that the screw blanks gradually telescope with the washer strip and aid in driving the strip. At the trailing edge of the assembly track 46 the track recedes from the periphery of the drive disc 48 to remove the screw blanks from the drive disc and the top surfaces of the rails 218 and 220 are tapered sharply toward the washer guideway 234 to form sharp edges 266. A leaf spring 268 is secured by means of a bracket 270 to the outer rail 218 and has a depending smoothly curved end or tongue 272 extending slightly beyond the sharp edges 266 to force the screw blanks 186 into completely telescoped relation with the washer strip 34.

To bring the washer strip 34 smoothly into the guideway of the assembly track 46, there is provided a roller 274 (Fig. 1) rotatably mounted on an upstanding arm 276 mounted on the upper inclined support 26 by means such as a bolt 278 passing through an angularly disposed flange 280. The roller 274 supports the washer strip at the proper elevation and the arm 276 prevents movement of the strip radially outwardly of the drum 32. As will be apparent, when the washers of a coil of washers 36 are assembled, the turns of the helical coil extending from the stack up over the roller 274 will gradually be spread farther apart. Accordingly, the drum must advance rotationally slightly relative to the drive disc 48. The frictional drive of the drum 32 provides only sufficient rotational force to the drum to tend to drive the drum and the washer strip readily advances the drum relative to the drive disc.

Stated differently, the washer strip drives the drum as it is unwound therefrom by the drive disc 48. The frictional drive of the drum tends to rotate the drum so that the strip needs to exert only a small driving force which does not place an undue drag on the strip; but the frictional drive does not hold the drum back as the strip tends to drive the drum faster than the frictional drive tends to.

Screw sensing mechanism has been disclosed heretofore to prevent operation of the assembly machine when no screws are being supplied. Similarly, the machine should not be operated when the washer strip 34 is exhausted or broken. Accordingly, I have presented washer strip sensing mechanism including an elongated arm 282 (Figs. 1, 4 and 12) pivotally mounted on the column 40 at 284 and carrying at its outer end a roller 286 the axis of which is laterally disposed relative to the washer strip. The washer strip 34 preferably is hardened prior to insertion on the drum and is sufficiently stiff to support the weight of the roller 286 and elongated arm 282 with no difficulty. A normally open switch 288 similar to the switch 214 is supported on the column 40 opposite to the switch 214 by a bracket 290. A switch actuating plunger 292 extends upwardly from the switch 288 and contacts the lower edge of the elongated arm 282 mounted on an extension of the pin 200 and spaced from the column 40 by a collar 202. Similarly to the switch 214, the switch 288 is connected in series with the electric drive motor (not shown) of the assembly machine or controls a relay in series therewith, so that when the washer strip becomes exhausted or should the strip in some way be broken, the arm 282 will drop to open the switch 288 and stop the drive motor.

After leaving the assembly track 46, the telescoped screw blanks and washer strip pass on to a guide rail 294, which, as may be seen in Fig. 7, is provided with a deep central slot to accommodate the shanks of the screw blanks 186 with the washer strip 34 and heads of the screw blanks riding atop the rail 294. The guide rail 294 continues on a smooth curve to the retainer forming mechanism 50 at which point it is discontinued (Fig. 14). The guide rail 294 is supported by means of a bracket 296 upstanding from the second upper table 30 (Fig. 4).

The retainer forming mechanism comprises a pair of nicking or swaging wheels 298 and 300 (Figs. 1, 4, 5, 14 and 15) fixed respectively on a pair of shafts 302 and 304. The shaft 304 is journalled in a bearing sleeve 305 carried in the supporting arm 86 mentioned heretofore. A hub 306 formed integrally with the wheel 300 spaces the wheel above this arm and secures the wheel 300 to the shaft by means such as a set screw. A sleeve 308 welded to the arm 86 provides a long bearing support and spaces a worm wheel 310 below the arm 86. The wheel 310 is secured to the shaft 304 by means such as a set screw in a hub 316 on the wheel to drive the shaft. A worm 312 on the main drive shaft 54 is in engagement with the worm wheel 310 and drives this worm wheel. A spur gear 314 is secured to the shaft 304 near the bottom thereof as by a nut or head on the shaft. The shaft 302 carrying the wheel 298 is journalled in a bearing sleeve 303 supported by a column 318 upstanding from the table 30 and having a laterally extending supporting arm 320 in which the shaft is journalled. The wheel 298 is spaced above the supporting arm 320 and secured to the shaft by means of a collar 322 integral with the wheel. A spur gear 324 is carried by the shaft 302 near the lower end thereof and is meshed with the gear 314 so that the wheel 298 is driven in unison with the wheel 300.

Nickers or swagers 326 and 328 (Figs. 14 and 15) are secured to the top of the wheels 298 and 300 respectively as by screws 330 and have peripherally spaced teeth 332 and 334 extending radially above substantially semicircular slots 336 and 338 spaced about the periphery of the wheels. The end of the guide rail 294 adjacent the wheels 298 and 300 is cut off angularly so as to approach the wheels as closely as possible. The shanks of successive screw blanks 186 are received by cooperating pairs of recesses 336 and 338 and the projecting teeth 332 and 334 bite into the shanks of the screw blanks to displace sections of metal 340 outwardly to form retainers preventing movement of the screw blanks from the washer strip 34. The teeth 332 and 334 are pointed and are inclined upwardly from the points toward the upper surfaces of the nickers or swagers 326 and 328 to force the sections of metal outwardly and upwardly so that the sections will lie relatively close to the washer strip 34.

A bridge 342 is provided spanning the nicking or swaging wheels 298 and 300. One depending leg 344 of the bridge is secured to the upstanding support 318 by means of bolts 346 while a second depending leg 348 is secured by bolts 350 extending through a table 352 into the intermediate support 60 which supports the table 352 from the table 30. A reversely bent leaf spring 354 is secured to the bridge 342 and has an extending tongue 356 pressing against the heads of successive screw blanks 186 to maintain the screw blanks in fully telescoped relation with the washer strip while the shanks of the screw blanks are nicked.

After leaving the retainer forming mechanism, the telescopically assembled screw blanks and washer strip are supported and guided by a stub track 358 (Figs. 1 and 16) similar to the rail 294 and supported by the table 352. In addition to the intermediate support 60, the table 352 is supported by an upstanding wall 360 secured to the second upper table 30 and is also supported by the upstanding wall 58. The table 352 may be secured to both of these walls by any desirable means such as bolts or by welding. The table 352 comprises a pair of parallel spaced apart plates 362 and 364 (Figs. 1, 16, 18 and 19). A circular aperture 366 is provided in the upper plate 364 to form a part of the separating mechanism 52. A smoothly curved slot 368 leads from the stub track 258 and merges with the circular aperture 366 to guide screw blanks smoothly into the edge of the aperture. A drive wheel 370 having a diameter substantially equal to that of the aperture 366 is mounted in the aperture 366. The drive wheel 370 is secured to a shaft 372 journalled in the lower plate 362 of the table 352 and a worm wheel 374 (Fig. 4) is fixed to the bottom of the shaft. A worm gear 376 meshed with the worm wheel 374 is secured to a shaft journalled in a bracket 378 secured to the upstanding wall 58. A bevel gear 380 is secured to the other end of this shaft as by a pin extending through a collar 382 formed integral with the bevel gear. The bevel gear 380 is meshed with a bevel gear 383 secured as by a pin through a collar 384 integral with the bevel gear 383 to the drive shaft 54 so that the drive wheel 370 may be driven by the drive shaft.

The periphery of the drive wheel 370 is provided with a plurality of slots 386 appropriately spaced to receive the shanks of successive screw blanks 186 as best may be seen in Figs. 4, 16 and 19. The slots are of proper size to hold the shanks relatively snugly against the periphery of the aperture 366 without binding. The drive wheel 370 is provided with a peripheral kerf 388 near its upper surface as best may be seen in Figs. 18 and 19. A screw blank guiding slot 390 arranged at a comparatively sharp angle to a tangent to the wheel 370 is defined at one side by a block 392 fitting in a gap in the upper plate 364 of the table 352 and secured to the lower plate 362 by any suitable means such as a screw 394. The other side of the slot 390 is defined by the upper plate 364 and by an ejector 395 and a clamping plate 396 fitting in a recess in the plate 364. The ejector 395 extends into the peripheral kerf 388 of the drive wheel 370 (Figs. 16 and 18) and has an arcuate inner end 398 located in close spaced relation to the inner edge of the kerf 388. Screws 400 extend through slots in the clamping plate 396 and through the ejector 394 and are threaded into the upper plate 364 to secure the ejector in properly adjusted position.

The arcuate inner edge 398 of the ejector meets the edge of the ejector helping to define the slot 390 to form a point 402. The deflecting edge of the ejector adjacent the point 402 directs successive screw blanks away from the drive wheel 370. The sudden deflection of the screw blanks away from the drive wheel twists the washers relative to the strip and in the plane thereof to break the interconnection 404 (Fig. 17) between each pair of washers 406 of the washer strip 34 to separate individual washers and telescoped screw blanks from the washer strip. The angle which the slot 390 forms with a tangent to the drive wheel 370 at the point where the ejector 395 intercepts the screw blanks 286 depends on the hardness of the washer strip and on the size and configuration of the interconnection 404 joining individual washers as well as on the driving speed and may be increased by changing the block 390, the ejector 395 and the clamping plate 396.

A summary of the operation of my screw blank and washer strip assembly machine is as follows:

Referring first to Fig. 5, the collar 134 connecting the shaft 92 and the drum shaft 130 is loosened and raised to free the shaft 130. The bolts 158 and 160 (Fig. 2) are loosened and the drum and its arm 154 are pivoted from the full line position marked A in Fig. 2 to the first dashed line position B. The arm 154 is then slid longitudinally to move the drum to the position C indicated by the dash-dot lines. A helically coiled nested strip of washers 36 is then lowered over the drum with the pins 182 extending upwardly from the lower flange of the drum fitting within aligned apertures of the nested washers. The drum is then restored to its initial position by a series of movements opposite to those just described and the washer strip is led over the roller 274 (Fig. 1), under the roller 286 of the washer strip sensing mechanism and into the guideway 234 of the assembly track 46. Screw blanks are fed down the chute 38 to the assembly mechanism where they are telescopically assembled with the washers of the strip. The strip and blanks further are fed by hand along the guide rail 294, the stub track 358, and the slot 368 until the shanks of the screw blanks are engaged by the teeth of the drive wheel 370.

The electric motor of the assembly machine then is started. The screw blanks descending from the feed chute 38 into the assembly mechanism have their shanks received by the slot in assembly track 46 and are engaged by the teeth 256 on the periphery of the drive disc 48 beneath the heads of the blanks properly to space the blanks 186 and to drive the blanks with no tendency to tip, the entire operation being assisted by gravity due to the inclination of the assembly machine. As the shanks of the screw blanks engage the apertures in the washer strip 34 in the assembly track, the screw blanks aid in driving the washer strip. It is apparent that successive screw blanks and the washer strip approach one another substantially linearly in the assembly track until they leave the drive wheel 48 and are forced into completely telescoped relation by the tongue 272 of the leaf spring 268.

The guide rail 294 directs the telescoped screw blanks and washer strip to the retainer forming mechanism 50 whereat the teeth 334 of the nickers or swagers 326 and 328 displace sections 340 of metal outwardly (Figs. 4 and 15) to prevent disassembly of screw blanks and the washer strip. During the retainer forming operation the blanks and washer strip are held in complete telescoped relation by the tongue 356 of leaf spring 354. The nicking or swaging wheels 298 and 300 act to drive the screw blanks and with them the washer strip.

The assembled screw blanks and washer strip are delivered from the retainer forming mechanism to the stub track 358 which leads to the slot 368 leading into the separating mechanism 52. At the separating mechanism 52 the shanks of the screw blanks, and with them the washer strip, are driven by the rotating drive wheel 370. As the path of the screw blanks and washer strip is suddenly changed by the ejector 395, the washers are successively turned relative to the strip and in the plane thereof to break the interconnections joining the individual washers of the strip to allow individual washers and assembled screw blanks to advance through the slot 390 from whence they drop to any desired station such as a storage bin or are fed to a plurality of thread rolling machines. The metal sections 340 displaced from the screw blank shanks prevent separation of the lock washers and screw blanks until threads are rolled on the shanks. When the threads are rolled on the shanks they displace the metal of the shanks sufficiently to completely obliterate the nicks and displaced metal sections 340 and increase the outside diameter of the screw blanks sufficiently to prevent disassembly of the finished screws and blanks.

Although a particular embodiment of my invention has been shown and described, it is apparent that this is for illustrative purposes only. Therefore it is to be understood that my invention is not to be limited to the embodiment shown and described but is to include all that which falls within the scope of the appended claims.

I claim:

1. Apparatus for assembling fastening elements and washers, comprising means for receiving a continuous helically coiled strip of washers, means for continuously feeding said strip from the coil over a spiral path, and means for directing a succession of fastening elements over a curved path converging with the spiral path of said strip in timed relation to the movement of said strip to bring said fastening elements and the washers of said strip into telescoping relation.

2. Apparatus for assembling fastener elements and washers, comprising means for receiving a continuous helically coiled strip of washers, means for feeding said strip along a spiral path at a continuous uniform rate, means for feeding the fastener elements in succession to a point of delivery, means receiving said elements in succession at said delivery point and conveying said elements at said continuous uniform rate over a curved path aligned with the spiral path of said strip but converging upon said strip to telescope the moving fastener elements and the washers of the moving strip.

3. Apparatus for assembling fastening elements and a continuous strip of washers, comprising means for receiving an edgewise coiled washer strip, means for positively feeding said strip from the coil over a curved path with the plane of said path substantially normal to the axis of said curve, and means for directing a succession of fastening elements over a curved path within a common plane perpendicular to the fastener axes and aligned with the path of said strip and converging substantially linearly with the path of said strip to bring said fastening elements and the washers of said strip into telescoping relation.

4. Apparatus for assembling fastening elements and washer elements, comprising means for receiving a coiled strip of washer elements, means for positively feeding said strip from the coil over a spiral path, means for directing a succession of fastening elements over a path converging with the path of said strip to bring said fastening elements and the washer elements of said strip into telescoping relation, and means spaced from said washers and engaging said fasteners at substantially only one position along said fasteners for forming a narrow section on each fastener to retain the washer in assembled relation therewith, said section being adapted for elimination in a subsequent thread rolling operation.

5. Apparatus for assembling fastener elements and washer elements, comprising means for receiving a coiled strip of washer elements, means for feeding said strip along a spiral path at a continuous uniform rate, means for feeding the fastener elements in succession to a point of delivery, means receiving said fastener elements in succession at said delivery point and conveying said fastener elements at said continuous uniform rate over a curved path aligned with the spiral path of said strip but converging upon said strip to teslescope the moving fastener elements and the washer elements of the moving strip, and means for forming a section on one of each pair of assembled elements to retain the other element in assembled relation.

6. Apparatus for assembling fastening elements and a strip of washers, comprising means for receiving a coiled strip of washers, means for feeding said strip from the coil over a predetermined path, means for feeding a succession of fastening elements over a path converging with the path of said strip in synchronism with the motion of said strip successively to telescope said fastening elements with the washers of said strip and means for abruptly changing the direction of motion of the leading part of the strip relative to the remainder thereof after assembly of the washers and fastening elements successively to shear the washers from the strip.

7. A method of producing assemblies of fastening elements and washer elements which comprises directing a strip of washer elements over a spiral path with the plane of said strip substantially normal to the axis of said path, and directing a succession of fastening elements over a curved path superimposed above the spiral path of said strip and converging therewith to bring said fastening elements and the washers of said strip into telescoping relation.

8. A method of producing assemblies of fastening elements and washers which comprises positively feeding a strip of washers at a predetermined uniform constant rate over a predetermined path curving substantially normal to the plane of said strip, and feeding a succession of fastening elements at the same uniform constant rate in synchronized relation along a path aligned with the path of said strip and converging therewith substantially linearly to bring said fastening elements and the washers of said strip into telescoping relation.

9. Apparatus for assembling screw blanks and a continuous strip of washers, comprising means for advancing a succession of headed screw blanks including a rotary wheel having a toothed periphery engaging the shanks of said screw blanks, and guiding means for a strip of washers, said guiding means progressively approaching the periphery of said wheel from below to bring the washers of said strip and said screw blanks into telescoping relation, the screw blanks telescoped with said strip acting to drive said strip, said guiding means then receding from said wheel substantially tangentially thereof to remove screw blanks from the toothed periphery of said wheel.

10. Apparatus for assembling headed screw blanks and a continuous strip of washers, comprising means for feeding a succession of headed screw blanks including a drive disc having a toothed periphery engaging the shanks of said screw blanks below the heads, a cylindrical drum for receiving a helically coiled strip of washers, means for feeding said strip synchronously with the screw blank feeding means from said drum into convergence with the underside of the periphery of said drive disc to assemble the washers of said strip telescopically with said screw blanks, and means applying a driving force to said drum including means for varying the phase between said drive disc and said drum as said washer strip is fed from said drum.

11. Apparatus for assembling headed screw blanks and a continuous strip of washers, comprising means for feeding a succession of headed screw blanks over a path substantially in a plane, means for receiving a coiled strip of washers, means for directing said strip over a path converging with said plane and aligned with said screw blanks telescopically to assemble said screw blanks and the washers of said strip, means for displacing a section of metal on the shank of each successive screw blank below the washer thereon to prevent disassembly of the screw blank and washer, means for separating each successive washer from the remainder of said strip, and means for operating said section displacing means and said separating means in timed relation with the movement of said strip.

12. Apparatus for assembling fastening elements and a continuous strip of washers, comprising means for feeding a succession of fastening elements over a predetermined path, means for feeding a strip of washers over a path converging with the path of said fastening elements telescopically to assemble said fastening elements and the washers of said strip, said strip feeding means including spaced apart means for supporting said strip at spaced points with the span of said strip between said spaced apart means otherwise unsupported, means for driving said feeding means, means for sensing the presence of fastening elements, means resting on and supported by said span for sensing the presence of said washer strip, and means actuated by either of said sensing means in the absence of the article to be sensed to render said driving means incapable of driving the other of said feeding means.

13. Apparatus for assembling headed screw blanks and a strip of washers, comprising means for feeding a succession of screw blanks over a predetermined path including a drive disc having a toothed periphery engaging the shanks of said screw blanks beneath the heads, means for receiving a continuous helically coiled strip of washers, means for directing said strip over a path converging with the underside of the periphery of said disc telescopically to assemble the washers of said strip, and said fastening elements, means for displacing a section of metal on the shank of each screw blank beneath the washer thereon to maintain each screw blank and washer thereon in assembled relation, means for successively separating the washers from the strip, and means for operating said section displacing means and said separating means in timed relation with the movement of said strip.

14. Apparatus for assembling headed screw blanks and a continuous strip of toothed lock washers, comprising means for feeding a succession of headed screw blanks including a rotary drive disc having a toothed periphery engaging the shank of each screw immediately below the head, means for receiving a continuous helically coiled strip of washers, successive washers having confronting teeth interconnected, means for directing said strip over a path converging substantially linearly with the underside of the periphery of said drive disc and aligned therewith telescopically to assemble the washers of said strip and said headed screw blanks, means for displacing a section of metal on the shank of each screw blank beneath the washer thereon to prevent disassembly of the blanks and washers, means for severing the thin section of metal interconnecting the teeth of successive lock washers to separate each lock washer from the remainder of said continuous strip, and means for operating said section displacing means and said severing means in timed relation with the movement of said strip.

15. Apparatus for assembling fastening elements and a strip of hardened lock washers, comprising means for directing a succession of fastening elements substantially in a plane substantially perpendicular to the axes of said fastening elements, means for receiving a coiled strip of hardened lock washers, means for directing said strip over a path converging substantially linearly with the path of said fastening elements and aligned therewith telescopically to assemble the washers of said strip and said fastening elements, means for displacing a section of each of said fastening elements to prevent disassembly of said fastening elements and the washers of said strip, means for changing the direction of movement of each successive hardened lock washer to sever successive washers from the remainder of the continuous strip, and means for operating said section displacing means and said severing means in timed relation with the movement of said strip.

16. In apparatus for assembling fastening elements and a strip of washers, the combination comprising an assembly track having a slot for receiving the shanks of a succession of screw blanks and curved substantially perpendicular to screw blank shanks received therein, said track further having a washer strip guideway aligned with and curved similarly to said slot and substantially perpendicular thereto, said assembly track having an upper screw blank guiding edge, said washer strip guideway being inclined toward said edge, means for positively feeding a succession of screw blanks through said assembly track with the shanks of said blanks extending into said slot, and means for feeding a strip of washers through said washer strip guideway synchronously with the movement of said screw blanks telescopically to assemble the washers of said strip with said screw blanks.

17. Apparatus for assembling headed screw blanks and a strip of washers, comprising a screw blank drive disc having a toothed periphery for engaging the shanks of screw blanks beneath the heads of said screw blanks, an assembly track partially underlying the periphery of said drive disc and partially extending outwardly therefrom and having a screw blank shank receiving slot and a washer strip guideway aligned with said slot and substantially perpendicular thereto, said assembly track having an upper screw blank guiding edge lying in part in the plane of the upper surface of said drive disc and said washer strip guideway being inclined toward said edge, means for introducing screw blanks into the slot of said assembly track with their shanks engaged by the toothed periphery of said drive disc, and means for feeding a continuous strip of washers through said washer strip guideway synchronously with the movement of said screw blanks telescopically to assemble the washers of said strip and said screw blanks.

18. In apparatus for assembling screw blanks and a strip of washers, each washer being connected to a contacting portion of an adjacent washer, separating mechanism including a drive disc having a succession of peripheral slots for receiving the shanks of successive assembled screw blanks and washers, means defining a guideway leading to said drive disc and merging therewith, a deflecting surface extending within the periphery of said disc at an angle which is sharp relative to the periphery of said disc to intercept the shanks of successive screw blanks and thereby deflect and sever successive washers from the remainder of said strip.

19. Apparatus for assembling headed screw blanks and a continuous strip of washers, comprising a screw blank drive disc having a toothed periphery engageable with the shanks of a succession of screw blanks, an assembly track underlying said disc, partially aligned with the periphery of said disc and partially extending outwardly therefrom, said assembly track having a screw blank shank receiving slot and a washer strip guideway aligned with said slot and substantially perpendicular thereto, said assembly track having an upper screw blank head guiding edge lying in part in the plane of the upper surface of said drive disc, said washer strip guideway being inclined toward said edge, means including a screw delivery chute for delivering a succession of screws to said assembly track with their shanks engaged by the toothed periphery of said drive disc and said shanks extending into the slot of said assembly track, a drum for receiving a continuous helically coiled strip of washers, means for feeding said strip through said washer strip guideway synchronously with the movement of said screw blanks telescopically to assembly the washers of said strip with said screw blanks, means for directing assembled washers and screw blanks from said assembly track, means for displacing a section of metal on the shank of each screw screw blank to maintain the screw blanks and washers in assembled relation, means for separating each successive washer from the remainder of said strip, and means for operating said section displacing means and said separating means in timed relation with the movement of said strip.

20. Apparatus for assembling fastening elements and washers, comprising means for receiving a continuous helically coiled strip of washers, means for continuously feeding said strip from the coil over a spiral path, and means for directing a succession of fastening elements over a path converging with the spiral path of said strip in timed relation to the movement of said strip to bring said fastening elements and the washers of said strip into telescoping relation.

21. Apparatus for assembling fastening elements and washers, comprising means for receiving an edgewise coiled washer strip, means for feeding said strip from the coil upwardly over a spiral path with the plane of said strip lying substantially normal to the axis of said spiral path, and means for directing a succession of fastening elements over a path above the spiral path of said strip and converging upon the path of said strip to bring said fastening elements and the washers of said strip into telescoping relation.

22. Apparatus for assembling fastening elements and washers, comprising means for receiving an edgewise coiled washer strip, means for feeding said strip from the coil over a spiral path with the plane of the washer strip substantially normal to the axis of the spiral path, and means for directing a succession of fastening elements over a path converging with the spiral path of said strip to bring said fastening elements and the washers of said strip into telscoping relation.

23. Apparatus for assembling fastening elements and washers, comprising means for receiving an edgewise coiled washer strip, means for feeding said strip from the coil over a curved path, the curve of said path lying substantially in the plane of said washer strip, and means for directing a succession of fastening elements over a path converging with the curved path of said strip to bring said fastening elements and the washers of said strip into telescoping relation.

24. Apparatus as set forth in claim 23 wherein the fastening element path is curved similarly to the washer strip path at least in part, and is aligned therewith at least in part.

25. Apparatus for assembling fastening elements and washers, comprising means for receiving an edgewise coiled washer strip, means for feeding said strip from the coil over a path curved edgewise of said washer strip, and means for directing a succession of fastening elements over a path curved substantially in a plane generally perpendicular to the axes of said fastening elements and converging with the path of said strip to bring said fastening elements and the washers of said strip into telescoping relation.

26. Apparatus for assembling headed screw blanks and a continuous strip of washers comprising means for feeding a succession of headed screw blanks along a predetermined path, a cylindrical drum for receiving a helically coiled strip of washers, means for feeding said strip synchronously with the screw blank feeding means from said drum into convergence with the predetermined path of said screw blanks to assemble the washers of said strip telescopically with said screw blanks, and means applying a driving force to said drum including means for varying the phase between said screw blank feeding means and said drum as said washer strip is fed from said drum.

27. Apparatus for assembling fastening elements and washers, comprising means for feeding a strip of washers at a continuous uniform predetermined rate over a predetermined path with the axes of adjacent washers disposed in substantial parallelism, and means for feeding a succession of fastening elements at the same rate and in timed relation to the movement of said strip within a plane transverse to the axes of said fastening elements, the axes of said fastening elements being substantially parallel to one another, said strip feeding path and said fastening element feeding path relatively converging to telescope said fastening elements with the washers of said strip.

28. Apparatus, for assembling fastening elements and a strip of washers, comprising means for receiving a coiled strip of washers, means for feeding said strip from the coil over a predetermined path, means for feeding a succession of fastening elements over a path converging with the path of said strip in synchronism with the motion of said strip successively to telescope said fastening elements with the washers of said strip, means for forming a peripheral abutment on each fastening element to prevent axial separation of the washer telescopically assembled therewith, and means for thereafter severing each assembled washer and fastening element from the strip.

29. Apparatus for assembling fastening elements and washers, comprising means for feeding a strip of washers over a predetermined path with the axes of adjacent washers substantially parallel to one another, means for feeding fastening elements with the longitudinal axes of adjacent fastening elements substantially parallel to one another over a predetermined path converging with the path of said strip to bring said fastening elements and the washers of said strip into telescoping relation, and means for operating said strip feeding means and said fastening element feeding means in synchronized relation.

30. Apparatus as set forth in claim 29, wherein the strip feeding path and the fastening element feeding path converge at a small acute angle whereby gradually to telescope the fastening elements and washers.

31. Apparatus for producing fastener units of fastening elements and washers comprising means for feeding a strip of interconnected washers over a predetermined path, means for feeding a succession of fastening elements over a predetermined path into telescoped relation with the interconnected washers, means for deforming a portion of one of each telescoped fastening element and washer to retain the same in telescoped relation, means for thereafter detaching the telescoped fastening elements and washers from the strip, and means for operating said washer strip feeding means, said fastening element feeding means, said deforming means, and said detaching means in proper time relation.

32. Apparatus as set forth in claim 31 wherein the fastening elements comprise screw blanks, and the deforming means deforms a portion of each screw blank shank.

33. Apparatus as set forth in claim 32 wherein the deforming means engages the shank at peripherally spaced points to swage a plurality of sections outwardly of each shank.

34. Apparatus for producing fastener units of washers and fastening elements comprising means for feeding a strip of interconnected washers and fastening elements telescoped therewith over a predetermined path, means adjacent said path for deforming one of each telescoped fastening element and washer to retain said fastening elements and washers in telescoped relation, means adjacent said path for thereafter severing the telescoped fastening elements and washers from the strip, and means for operating said feeding means, said deforming means, and said severing means in proper time relation.

35. Apparatus as set forth in claim 34 wherein the fastening elements comprise screw blanks having heads and shanks, and wherein the deforming means engages each shank at peripherally spaced points to swage a section outwardly of the shank.

36. The method of producing fastener units which comprises telescoping a plurality of fastening elements with washers in strip form, deforming one of each telescoped washer and fastening element to retain them in telescoped relation, and thereafter detaching the telescoped fastening elements and washers from the strip.

37. The method set forth in claim 36 wherein the fastening elements comprise headed screw blanks wherein the deforming step comprises engaging the shank of each blank at peripherally spaced points to swage a section outwardly of each shank.

References Cited in the file of this patent

UNITED STATES PATENTS

| Number | Name | Date |
|---|---|---|
| 744,244 | Semmer | Nov. 17, 1903 |
| 2,180,555 | Sipe | Nov. 21, 1939 |
| 2,271,154 | Niskanen | Jan. 27, 1942 |
| 2,284,676 | Nielsen | June 2, 1942 |
| 2,284,698 | Trotter | June 2, 1942 |
| 2,303,224 | Olson | Nov. 24, 1942 |
| 2,390,121 | Poupitch | Dec. 4, 1945 |
| 2,642,593 | Poupitch | June 23, 1953 |